United States Patent Office 3,699,037
Patented Oct. 17, 1972

3,699,037
CATALYTIC CRACKING
Richard J. Annesser and Stephen A. Balogh, Berkeley, Calif., assignors to Chevron Research Company, San Francisco, Calif.
No Drawing Filed Oct. 28, 1970, Ser. No. 85,836
Int. Cl. B01j 11/68; C01b 17/56; C01g 11/02
U.S. Cl. 208—120          9 Claims

ABSTRACT OF THE DISCLOSURE

A process for reducing the $SO_2$ emission from a catalytic cracking unit wherein a hydrocarbon feedstock containing organic sulfur compounds is fed to a reaction zone and contacted with cracking catalyst at a temperature in the reaction zone between 750 and 1150° F. and the cracking catalyst is then regenerated in a regeneration zone by burning coke off the cracking catalyst at a temperature between 800–1300° F. and the regenerated cracking catalyst is recycled to the reaction zone, which process comprises adding a material selected from the group consisting of calcium compounds, magnesium compounds and mixtures thereof to the catalytic cracking unit cycle at a rate at least as large as the stoichiometric rate of sulfur deposition on the cracking catalyst in the reaction zone.

BACKGROUND OF THE INVENTION

The present invention relates to reduction of $SO_2$ emission from a catalytic cracking unit. More particularly, the present invention relates to injection of material into the catalytic cracking unit cycle to reduce the amount of $SO_2$ emission from the catalytic cracking unit regenerator.

Processes for the catalytic conversion or cracking of hydrocarbons are well known. In these processes, liquid hydrocarbons such as gas oil, naphtha, reduced crude, whole crude, or the like, are contacted with active conversion or cracking catalysts at temperatures of from about 800° F. to 1100° F. for a period to give the desired conversion. These processes may utilize the catalyst in the form of a moving bed, or powdered or microspherical catalyst using the fluid technique. Also, catalysts may be used in suspensoid cracking and other related processes. High boiling hydrocarbons such as gas oil are catalytically cracked to produce lower boiling hydrocarbons such as gasoline.

During hydrocarbon conversion or cracking, there is deposition of coke or carbonaceous material on the catalyst. The catalyst is periodically regenerated by burning off the coke or carbonaceous material with air or other oxygen-containing gas. The temperature during regeneration is preferably maintained between about 850° F. and 1150° to 1300° F., higher temperatures usually being avoided in order to prevent deactivation of the catalyst by overheating. After prolonged or extended use, during which time the catalyst is repeatedly used for conversion or cracking and is then regenerated, the catalyst loses activity and selectivity and, because of this, the catalyst does not work as efficiently as it does when it is fresh or when it is first put in the unit. Therefore, periodically, a portion of the cracking catalyst is withdrawn from the catalytic cracking unit and fresh catalyst make-up is added to the catalytic cracking unit.

Commercialized catalytic cracking processes include Fluid Catalytic Cracking as developed by Universal Oil Products Company and discussed in Petroleum Refiner, vol. 30, No. 3, March 1951, pp. 130–136; Fluid Catalytic Cracking as developed by Esso Research and Engineering Company and described in Petroleum Refiner, vol. 35, No. 4, April 1956, pp. 201–205; Fluid Catalytic Cracking, Orthoflow, as developed by the M. W. Kellogg Company and discussed in Hydrocarbon Processing, vol. 42, No. 5, May 1963, pp. 135–140; Airlift TCC as developed by Mobil Oil Corporation, and described in Petroleum Refiner, vol. 31, No. 8, August 1952, pp. 71–78; and Houdriflow Catalytic Cracking as developed by Houdry Process and Chemical Company, Div. of Air Products and Chemicals, Inc., and described in Ashwill et al., "Commercial Operations over HZ-1 Cracking Catalyst," A.P.I. meeting, Houston (1966).

The latter two processes, i.e., Airlift TCC and Houdriflow Catalytic Cracking, are moving bed catalytic cracking processes whereas the first three processes mentioned are fluid catalytic cracking (FCC) processes. We have found that the process of the present invention is particularly advantageously applied to fluid catalytic cracking units.

In fluidized catalytic cracking processes, usually the mass of solid catalyst particles from which combustible contaminants are being burned is maintained in a regeneration zone in the form of a fluid-like bed of relatively high density solid particle concentration. In operations of this general type it is advantageous to maintain a light-phase (dilute phase) region of materially reduced solid particle concentration above the fluid-like (dense phase) bed in the confined zone or vessel in which burning is accomplished. By so doing, a major separation of the solid catalyst particles from the gaseous products of combustion leaving the fluid-like bed is effected within the latter at substantially its upper extremity and within the lower portion of the light phase above the bed, so that only a small amount of entrained solid particles remains to be separated from the outgoing gas stream, thus reducing the load on the solid particle separating equipment employed.

Large quantities of flue gases result from burning coke off the cracking catalyst in the catalyst regeneration zone. The flue gases are separated as much as possible from the cracking catalyst particles in the regeneration zone. Further equipment including cyclones and electrostatic precipitators are used to remove remaining catalyst particles and particularly finely divided parts of catalyst particles ("fines") from the flue gases before the flue gas is vented to the atmosphere.

The flue gas typically contains between about 0.01 and 0.15 volume percent $SO_2$. The $SO_2$ is derived from sulfur present in the hydrocarbon feedstock to the catalytic reactor. About 1–12 weight percent of the sulfur present in the hydrocarbon feedstock deposits in the coke which forms on the cracking catalyst during the cracking reactions. When the coke is burned off the catalyst in the regenerator, the sulfur is oxidized to $SO_2$.

Because of the increased desires to limit $SO_2$ emission to the atmosphere, it is apparent that it is desirable to reduce the amount of $SO_2$ in the effluent from a catalytic cracking unit.

A wide variety of $SO_2$ removal processes have been suggested in the past for removing $SO_2$ from various gas streams. For example, U.S. Pat. 3,411,865 discloses a method of removing sulfur dioxide from hot gaseous mixtures comprising contacting the hot gaseous mixtures with a solid acceptor for sulfur dioxide comprising a mixture of an alkali metal oxide and a minor amount of iron oxide. U.S. Pat. 3,438,722 discloses a method for removing sulfur dioxide from flue gas by absorption of the sulfur dioxide in a molten alkali metal carbonate mixture. According to U.S. Pat. 3,454,356, sulfur oxides are removed from waste gases by contacting the waste gases with a catalyst-absorbent material comprising vanadium trioxide, vanadium tetroxide and mixtures thereof.

The spent catalyst-absorbent is regenerated by heating at elevated temperatures in the presence of sulfur dioxide.

As disclosed in U.S. Pat. 3,343,908, materials such as calcium and magnesium oxides or carbonates have been suggested in the past for reducing corrosion in certain parts of furnaces by reaction of the calcium or magnesium compounds with sulfur trioxide. According to U.S. Pat. 3,343,908, the magnesium or calcium compounds are added at a temperature less than 400° C. (752° F.). Materials such as calcium and magnesium carbonates and oxides have also been used at higher temperatures for removal of $SO_2$ from power plant flue gases. According to U.S. Pat. 3,520,649, $SO_2$ and fly ash are removed from a flue gas stream resulting from the burning of coal by a process which comprises introducing a powdered alkaline material into the coal burning furnace and thereby producing sulfate, sulfite and oxide materials which will carry along with fly ash particles in a resulting flue gas stream, and then introducing such resulting gaseous stream and entrained materials into a scrubbing zone to pass countercurrently to a recirculating and descending alkaline scrubbing slurry stream. Since the alkaline material is introduced to the coal burning furnace, it is reacted with the $SO_2$ at a temperature in excess of 2,000° F.

Suitable alkaline materials according to U.S. Pat. 3,520,649 include limestone (which is mostly calcium carbonate) and dolomite (which is mostly calcium and magnesium carbonate). At the high temperature burning zone or boiler zone in the process according to U.S. Pat. 3,520,649, calcium and magnesium oxides from the limestone and dolomite additive materials combine with about half of the $SO_2$ present in the flue gas stream to form calcium and magnesium sulfates and sulfite compounds. $SO_2$ which is not reacted with the calcium and magnesium oxides in the furnace is scrubbed out together with fly ash material in the alkaline aqueous scrubbing step applied to the flue gases after they are removed from the furnace.

According to U.S. Pat. 3,520,649, the quantity of additive alkaline material injected into the furnace generally will be about 10 percent or more by weight of the powdered coal passing into the power plant furnace.

Thus, it is apparent that the calcium and magnesium compounds used to react with $SO_2$ in boiler or power plant operation are used at a very high temperature, usually above 2000° F. Also, only about half of the $SO_2$ is reacted with the alkaline additive and large quantities of the additive are required, usually about 10 percent or more of the weight of the coal burned in the boiler or power plant furnace. Temperatures used in catalytic cracking units for catalyst regeneration are restricted to temperatures below about 1300 F. Also, additive injection rates as high as 10 weight percent of the feed to a catalytic cracking unit would be prohibitively expensive in addition to the fact that more than 50 percent $SO_2$ removal would be desired without the necessity of resorting to a wet scrubbing process.

Although the use of materials such as calcium carbonate, boron, and barium compounds have been suggested in the past for use in catalytic cracking processes to reduce catalyst attrition (particularly moving bed processes, see U.S. Pat. 3,030,300 and U.S. Pat. 3,030,314), the use of compounds such as these has not been suggested for reducing $SO_2$ emission from catalytic cracking units and particularly such compounds are not believed to have been used for any purpose in a manner in accordance with the process of the invention described hereinbelow.

SUMMARY OF THE INVENTION

The present invention is based in part on the finding that calcium and magnesium oxides can in fact be used to reduce the $SO_2$ emissions from a catalytic cracking unit more than 70 percent. The present invention provides a process for reducing the $SO_2$ emission from a catalytic cracking unit wherein a hydrocarbon feedstock containing organic sulfur compounds is fed to a reaction zone and contacted with cracking catalyst at a temperature in the reaction zone between 750 and 1150° F. and the cracking catalyst is then regenerated in a regeneration zone by burning coke off the cracking catalyst at a temperature between 800–1300° F. and the regenerated cracking catalyst is recycled to the reaction zone, which process comprises adding a material selected from the group consisting of calcium compounds, magnesium compounds and mixtures thereof to the catalytic cracking unit cycle at a rate at least as large as the stoichiometric rate of sulfur deposition on the cracking catalyst in the reaction zone.

As indicated previously, the $SO_2$ present in the flue gas from the catalytic cracking regenerator is derived from sulfur present in the feedstock to the reactor. Only a relatively small portion of the sulfur present in the feedstock to the catalytic cracking reactor remains with coke on the cracking catalyst when the cracking catalyst is passed from the reactor to the regenerator for regeneration. (Most of the organic sulfur present in the feedstock to the cracking unit is converted to hydrogen sulfide in the reaction zone of the catalytic cracking unit. The hydrogen sulfide is recovered, together with light hydrocarbon gases, from the catalytic cracking unit reaction zone effluent. After separating the $H_2S$ from the light hydrocarbon gases, the $H_2S$ is typically converted in a Claus plant to sulfur.)

The material which is injected into the catalytic cracking unit cycle according to the process of the present invention can be selected from various calcium and/or magnesium compounds including carbonate and oxide compounds. Preferably, the material added to the catalytic cracking unit cycle is selected from the group consisting of $Ca(OH)_2$, $CaCO_3$, $MgCO_3$, $CaO$, $Mg(OH)_2$, $MgO$, dolomite, limestone and mixtures thereof.

According to one preferred embodiment of the process of the present invention, the additive material such as calcium carbonate or calcium oxide is injected into the regeneration zone of the catalytic cracking unit to obtain efficient utilization of the additive in reaction with $SO_2$ to reduce $SO_2$ emission in the flue gas from the regenerator. However, the additive can also be injected or introduced to the catalytic cracking reactor and other points in the catalytic cracking unit cycle, which cycle basically consists of the recycling of the cracking catalysts between the reaction zone and the regeneration zone of the catalytic cracking unit, but which cycle also includes the introduction of hydrocarbon feed to the cracking unit and also, the introduction of fresh cracking catalyst particles to the unit.

The process of the present invention is advantageously applied to cracking unit feedstocks which have a substantial amount of sulfur usually present in the form of organic sulfur compounds. Thus, the process of the present invention is advantageously applied to feedstocks containing about 0.1 weight percent or more sulfur, although usually the feed to the cracking unit will not contain in excess of about 2.5 weight percent sulfur. Because the process of the present invention is directed to reaction of the added material with $SO_2$ to reduce $SO_2$ emissions, it is preferred to add the material at a rate at least as large as the stoichiometric rate of sulfur deposition on the cracking catalyst in the reaction zone. The reaction of $SO_2$ with added material can be exemplified by the following reaction:

$$CaO + SO_2 + \tfrac{1}{2}O_2 \rightleftharpoons CaSO_4 \qquad (1)$$

For the above reaction, on a stoichiometric basis, 0.875 lb. of calcium oxide are required for each pound of sulfur dioxide.

In the process of the present invention, it is preferred to add the material in finely divided form but preferably, at a particle size greater than about 20 microns. Usually less than a small weight percent of 20 microns and larger size particles will immediately escape from the regenerator with the catalyst fines. The 20 microns plus added material will have increased opportunity to react with the $SO_2$ due to recycling of the material between the regeneration and reaction zone so that the material will have from several minutes to an hour, for example, 5–10 minutes residence time in the catalytic cracking unit. The increased residence time is a particularly important feature of this preferred embodiment of the present invention, as it allows for increased opportunity of the additive material to react with the sulfur dioxide, thus obtaining more complete utilization of the added material and making the process more economically feasible than, for example, processes wherein the amount of material added is 10 percent or more of the weight of the hydrocarbon being processed. In many instances, smaller particle sizes are also effective for the additive material because additive material has some tendency to adhere to the catalyst particles.

However, although the additive material is at least in part recycled in the process of the present invention, because the material is reacting with $SO_2$, the rate of addition of the material on a molar basis preferably is at least as great as the molar rate of formation of $SO_2$ in the regenerator. Any recycled material which is already reacted with the $SO_2$ to form a sulfate or sulfite will, of course, not be effective to react with additional $SO_2$.

For each 100 lbs. of sulfur in the hydrocarbon feedstock to the catalytic cracking unit, only a small part as, for example, 5 weight percent, i.e., 5 lbs of sulfur are deposited with the coke on the cracking catalyst. The 5 lbs. of sulfur are equivalent to $5/32$ mole of sulfur which, according to the exemplary reaction (1) given above, require $5/32$ mole of calcium oxide or about 8.75 lbs. calcium oxide. Although the calcium oxide may be the reactive constituent with $SO_2$, the calcium can be added in other forms such as calcium carbonate. Therefore, it is more convenient to consider the stoichiometric amount of calcium compound on the basis of calcium which, in this instance, would be 6.25 lbs. calcium for $5/32$ mole of calcium. Five to ten times more (than the stoichiometric amount as explained above) calcium or calcium compound can be added to obtain improved reduction of emissions of the $SO_2$ in the regenerator flue gases. Thus, a rate of about 0.0625 up to 0.5 lb. of calcium (with the calcium usually being added as a compound) is preferably added to the catalytic cracking unit per pound of sulfur in the feed to the catalytic cracking unit when about 5 weight percent of the sulfur in the feed is deposited with the coke on the cracking catalyst.

In addition to the preferred embodiment as indicated above wherein the material is added to the regenerator, we have found that good results are achieved when the material is added with the fresh catalyst used in the catalytic cracking process.

The process of the present invention is particularly advantageously applied to fluid catalytic cracking units although it can also be used in moving bed catalytic cracking units. In the fluidized catalytic cracking units, it is particularly advantageous to add the material to the catalytic cracking unit cycle by injecting or blowing the material in in finely divided form to the dilute phase of the cracking catalyst in the regeneration zone of the fluid catalytic cracking unit.

As indicated previously, increased utilization of the added material is obtained according to a preferred embodiment of the process of the present invention by using material at least a majority of which is in a finely divided particle form having a size greater than 20 microns as, for example, 20–100 microns. We have also determined that a particularly preferred embodiment for improving the utilization of the added material is achieved by recycling a portion of the fines separated from the flue gas from the regenerator. The fines are composed in large part of small portions of catalyst particles, for example, less than 40 microns; but in the process of the present invention, the fines will usually also contain a substantial amount of the additive material which has not yet been reacted with $SO_2$.

In view of the often high tendency of fine particles to adhere to other particles such as catalyst particles and also in view of the preferred embodiment wherein fines are recycled to the catalytic cracking cycle, in many instances it is preferred to use added material of relative small size, less than 80 microns in diameter, for example, 5 to 50 microns in diameter.

EXAMPLES

A sample of Filtrol (F–800) catalytic cracking catalyst was withdrawn from an operating FCC unit regenerator. The sample was blended with various amounts of calcium additives as shown in Table I below and then contacted in a laboratory fluid catalyst test unit (FCTU) at 925° F. with a gas oil hydrocarbon feedstock containing 2.17 weight percent sulfur. After the reaction portion of the FCTU cycle, the coked catalyst was removed and regenerated at 1100° F. by burning the coke off using air. The data tabulated in Table I below show the amount of $SO_x$ ($SO_x$ meaning $SO_2$ and some $SO_3$) release from the catalyst during the regeneration for various levels of calcium additive including the use of no additive. As can be seen from the table, using no additive, about 125 to 129 parts per million (by weight of catalyst) sulfur was released (the sulfur, of course, being released in the form of $SO_2$ and some $SO_3$), whereas the amount released was less than 50 parts per million (by weight of catalyst) when 5000 parts per million calcium oxide was blended with the catalyst used according to the procedure described above. Using 10,000 parts per million of a mixture consisting of 40 percent calcium carbonate, 50 percent calcium phosphate, and 10 percent magnesium oxide, the $SO_x$ release from the catalyst upon burning the coke off the catalyst was only about 37 to 40 parts per million (by weight of catalyst) calculated as sulfur. Thus, the amount of $SO_x$ release was reduced from the 125 parts per million level by about 70 percent.

TABLE I

| Catalyst additive | Wt. Percent coke on catalyst | $SO_x$ release (calc. as wt. p.p.m. of S evolved from catalyst sample) | Mole ratio CaO/S (in coke) |
|---|---|---|---|
| No additive | 1.0 | 125, 129 | 0 |
| 1,000 p.p.m. CaO | 1.0 | 109 | 4.2 |
| 5,000 p.p.m. CaO | 1.0 | 48 | 21 |
| 10,000 p.p.m: 40% $CaCO_3$, 50% $CaPO_4$, 10% MgO. | 1.0 | 37, 40 | 10.1 |

In addition to the demonstration of the effectiveness of the additive to reduce $SO_2$ emission from catalytic cracking catalysts such as catalysts used in fluid catalytic cracking, the above exemplary data also illustrate that the calcium or magnesium additive can be introduced with catalyst used in the catalytic cracking reaction zone but yet still serve to greatly reduce the amount of $SO_2$ released from the catalyst when the catalyst is subsequently regenerated in a regeneration zone. The unexpected finding of the effectiveness of the additive to reduce $SO_2$ emission during regeneration even though the additive is first added during the reaction phase of the catalytic cracking cycle is particularly important as it demonstrates that the additive can effectively be used in recycle fashion between the regeneration zone and the cracking zone so as to achieve a high utilization of the additive and render the $SO_2$ emissions reduction process more economically feasible.

The additive used in the experiments tabulated in Table I was in a finely divided powder form with the additive particle size being mostly within the range of about 1–40 microns in diameter.

Although various embodiments of the invention have been described, it is to be understood that they are meant to be illustrative only and not limiting. Certain features may be changed without departing from the spirit or scope of the present invention. It is apparent that the present invention has broad application to the reduction of $SO_2$ emissions from a catalytic cracking unit regenerator by introduction of an additive such as a calcium or magnesium compound to the catalytic cracking unit cycle. Accordingly, the invention is not to be construed as limited to the specific embodiments or examples discussed but only as defined in the appended claims or substantial equivalents of the claims.

We claim:

1. A process for reducing the $SO_2$ emission from a catalytic cracking unit wherein a hydrocarbon feedstock containing organic sulfur compounds is fed to a reaction zone and contacted with cracking catalyst at a temperature in the reaction zone between 750 and 1150° F. and the cracking catalyst is then regenerated in a regeneration zone by burning coke off the cracking catalyst at a temperature between 800–1300° F. and the regenerated cracking catalyst is recycled to the reaction zone, which process comprises adding a material selected from the group consisting of calcium compounds, magnesium compounds and mixtures thereof to the catalytic cracking unit cycle at a rate at least as large as the stoichiometric rate of sulfur deposition on the cracking catalyst in the reaction zone, and wherein the hydrocarbon feedstock contains between 0.1 and 2.5 weight percent sulfur.

2. A process in accordance with claim 1 wherein the material added is selected from the group consisting of $Ca(OH)_2$, $CaCO_3$, $MgCO_3$, $Mg(OH)_2$, CaO, MgO, dolomite, limestone and mixtures thereof.

3. A process in accordance with claim 1 wherein said material is introduced to the catalytic cracking unit cycle via the regeneration zone.

4. A process in accordance with claim 1 wherein between 0.0625 and 0.5 lb. of calcium is added to the catalytic cracking unit per pound of sulfur in the feed to the catalytic cracking unit.

5. A process in accordance with claim 1 wherein said material is added in finely divided particle form but with a majority of the particles having a size of at least 20 microns in diameter.

6. A process in accordance with claim 1 wherein said material is added with fresh catalyst make-up to the catalytic cracking unit cycle.

7. A process in accordance with claim 1 wherein the catalytic cracking unit is a fluid catalytic cracking unit.

8. A process in accordance with claim 7 wherein the cracking catalyst is regenerated in a regenerator having a dense phase and a dilute phase of fluidized catalyst particles and wherein said material is introduced to the catalytic cracking unit cycle by injection into the dilute phase.

9. A process in accordance with claim 1 wherein solid finely divided particles containing said material is separated from the regenerator flue gases and at least a portion of the fines containing said material is recirculated to the catalytic cracking unit.

References Cited

UNITED STATES PATENTS

| 3,030,300 | 4/1962 | Flanders et al. | 208—114 |
| 3,030,314 | 4/1962 | Knowlton et al. | 252—432 |
| 3,343,908 | 9/1967 | Wickert | 23—2 |
| 3,475,121 | 10/1969 | Thornton | 23—178 |
| 3,520,649 | 7/1970 | Tomany et al. | 23—2 |

DELBERT E. GANTZ, Primary Examiner

G. E. SCHMITKONS, Assistant Examiner

U.S. Cl. X.R.

23—2 SQ, 178 S; 208—121, 164, 165, 208 R, 226; 252—416, 417